United States Patent
Haussmann

[11] Patent Number: 6,161,616
[45] Date of Patent: Dec. 19, 2000

[54] HARD-SOLDERED FLAT TUBE EVAPORATOR WITH A DUAL FLOW AND ONE ROW IN THE AIR FLOW DIRECTION FOR A MOTOR VEHICLE AIR CONDITIONING SYSTEM

[75] Inventor: Roland Haussmann, Wiesloch, Germany

[73] Assignee: Valeo Kilmatechnik GmbH & Co., KG, Hochenheim, Germany

[21] Appl. No.: 09/214,539

[22] PCT Filed: May 5, 1998

[86] PCT No.: PCT/EP98/02634

§ 371 Date: Feb. 9, 1999

§ 102(e) Date: Feb. 9, 1999

[87] PCT Pub. No.: WO98/50745

PCT Pub. Date: Nov. 12, 1998

[30] Foreign Application Priority Data

May 7, 1997 [DE] Germany ............... 197 19 252

[51] Int. Cl.[7] ...................................................... F28D 7/06
[52] U.S. Cl. ........................... 165/176; 165/148; 165/153; 165/152
[58] Field of Search ...................................... 165/152, 153, 165/176, 174, 109.1; 62/525, 527; 123/41.1

[56] References Cited

U.S. PATENT DOCUMENTS

| | | | |
|---|---|---|---|
| 1,454,107 | 5/1923 | Curran ................................. | 165/153 |
| 3,605,882 | 9/1971 | Smith et al. ......................... | 165/153 |
| 5,076,354 | 12/1991 | Nishishita . | |
| 5,318,114 | 6/1994 | Sasaki ................................. | 165/176 |
| 5,431,217 | 7/1995 | Kadle et al. ........................ | 165/153 |
| 5,448,899 | 9/1995 | Ohara et al. ........................ | 165/153 |

FOREIGN PATENT DOCUMENTS

| | | |
|---|---|---|
| 0 710 811 | 5/1996 | European Pat. Off. . |
| 25 06 631 | 11/1975 | Germany . |
| 195 15 526 | 5/1996 | Germany . |
| 4-309766 | 11/1992 | Japan ................. 165/153 |

*Primary Examiner*—Ira S. Lazarus
*Assistant Examiner*—Terrell McKinnon
*Attorney, Agent, or Firm*—Morgan & Finnegan LLP

[57] ABSTRACT

The invention refers to a hard-soldered (brazed) flat tube evaporator with a dual flow (double flow) and one row in the air flow direction of aluminum or an aluminum alloy for a motor vehicle air conditioning equipment in which on the inlet side a distributor of the refrigerant to the inlets of individual flat tubes or preferably groups thereof is provided and the flat tubes are extruded multi-chamber tubes between which zig zag fins are internested in a sandwich fashion. According to the invention, it is provided that the structural depth of the evaporator is at most 50 mm.

32 Claims, 4 Drawing Sheets

HARD-SOLDERED FLAT TUBE EVAPORATOR WITH A DUAL FLOW AND ONE ROW IN THE AIR FLOW DIRECTION FOR A MOTOR VEHICLE AIR CONDITIONING SYSTEM

BACKGROUND OF THE INVENTION

The invention relates to a dual flow or double-flow hard-soldered or brazed flat tube evaporator for a motor vehicle air conditioning equipment with one row in the air flow direction, the evaporator being made of aluminum or an aluminum alloy and having the features of the preamble of claim 1. Such a double-flow flat tube evaporator is known from the DE-195 15 526 C1 among further embodiments with more than two flows.

Commercially available flat tube evaporators of such a construction have a structural depth of 60 mm in prototypes which just have become public, while the standard structural depth in comparable plate evaporators is 66 to 100 mm.

As the mentioned publication, according to which the preamble of claim 1 is formed, already shows, in the past efforts have been made to increase the efficiency going over to evaporators with more than two flows, if desired.

Moreover, in double-flow evaporators as well as in evaporators having more than two flows, efforts have been made to feed the individual flat tubes in a proportion of liquid to gaseous refrigerant which is as constant as possible, and for this purpose to distribute the refrigerant to the inlets of groups of flat tubes on the inlet side, as it is already provided in the mentioned kind of evaporators, according to which the preamble of claim 1 is formed. In equivalence thereto, the idea to carry out this distribution furthermore with respect to each individual flat tube, which idea is at present not traceable in the prior art, is considered to be included in the kind of evaporators referred to in the preamble of claim 1. Such a distribution to individual tubes of an evaporator, but not expressively of a flat tube evaporator, is known per se from the EP-A1-0 566 899.

In all such distributions of the refrigerant to flat tubes on the inlet side, at the same time a distribution to all chambers of the respective flat tube is effected, which chambers extend one after the other in the direction of the structural depth of the evaporator. In this case, the structural depth of the evaporator is identical to the corresponding breadth dimension of the flat tube in a borderline case. The breadth dimension of the flat tube, however, can also be somewhat smaller, in particular if a corresponding overhang of the zig zag fins is included on a front side.

The fitting space available in the motor vehicle is always a main problem, in particular when fitting structural members into motor vehicles. Therefore, with structural members to be fitted into motor vehicles, there generally always is a tendency to minimize the outer dimensions with a useful effect being predetermined. It has to be taken as granted that this basic idea was also the basis in all known generic flat tube evaporators referred to in the preamble of claim 1 which are on the market. One can derive from this fact that the experts did not consider a structural depth of less than 60 mm to be appropriate in such flat tube evaporators, taking into consideration all requirements.

BRIEF DESCRIPTION OF THE DRAWINGS

The invention is based on the recognition that this assumption is based on a precondition.

The invention is rather based on the recognition that even with otherwise constant parameters of known generic flat tube evaporators, a reduction of the structural depth is at least partially compensated by the fact that in the process the efficiency of the distribution means is increased. For with a reduced structural depth, on the inlet side the refrigerant only has to be distributed to a smaller number of chambers of the flat tubes per inlet chamber fed by the distribution duct.

Figure 1:
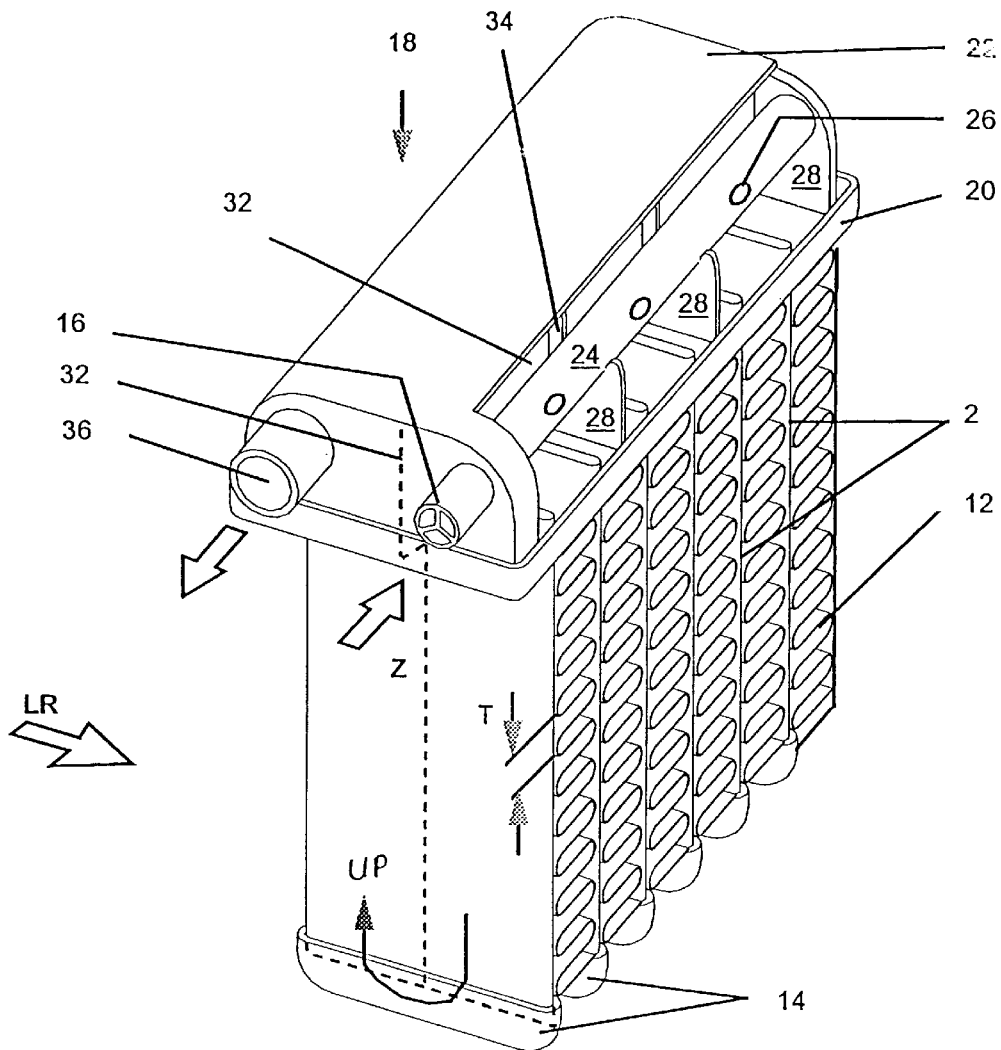

In this sense, the invention describes a way to achieve an optimization by reducing the structural depth instead of by increasing the number of flows to be higher than two.

Correspondingly, the object underlying the invention is to increase the efficiency of a double-flow flat tube evaporator of the type referred to in a manner very simple as to the construction.

This object is solved in a flat tube evaporator with the features of the preamble of claim 1 by the combination of the values of the characterizing part thereof. Here, not only a low region of structural depths is selected, but additionally the value of the interspace between two adjacent flat tubes occupied by a zig zag fin is determined.

The meaning of this combination of values can be best explained by means of examples. That is, when for example one goes over from the lowest conventional structural depth of 60 mm to 42 mm in the sense of a medium value of the combination of the invention, and if one also selects the interspace between the flat tubes to be smaller than usual or at least to be in the region of the values according to the invention, one obtains a configuration in which the reduction in the structural depth essential for a motor vehicle is essentially compensated by a relatively high number of flat tubes arranged one next to the other. This effect interferes with the already discussed better distribution of the refrigerant in a favourable sense. The design of the double-flow flat tube evaporator according to the invention, which is especially simple as to its construction, can already be recognized by the fact that the increase of the relative efficiency enables a reduction in the structural depth being particularly considerable with respect to the small fitting space of motor vehicles, without having to deteriorate the thermal output of the evaporator. A result thereof is a reduction of constructional material in the direction of the structural depth, and longitudinal crosswise walls necessary due to a multi-flow design are rendered dispensable.

The EP-A2-0 414 433 does not show, like the flat tube evaporator according to the invention, a design with one row in the air flow direction, which determines the structural depth, but a design with two rows in the air flow direction (so-called duplex arrangement) also of an evaporator (column 6, lines 34–37) with two separate heat exchanger blocks also using flat tubes, which are arranged one after the other in the air flow direction at distances to one another. This arrangement is based on the concept to obtain the thermal output by increasing the built-in depth in contrast to reducing it according to the invention. Even in case of overlapping dimensions in the individual heat exchanger block of this duplex arrangement with the combination of values according to the invention, thereby the combination according to the invention cannot be incited in a flat tube evaporator with a one-row design.

The DE-A1-30 20 424 generally concerns a heat exchanger in a design with flat tubes, which is developed under the conditions of a radiator of motor vehicles. This prepublication starts from a prior art of a radiator having a structural depth of 32 to 35 mm and reduces it in another combination of values to 23 mm and less. A transfer of these conditions of a heat exchanger, such as a water cooler in motor vehicles, to a flat tube evaporator in motor vehicles is not possible. This already becomes clear due to the fact that the conventional flat tube evaporators did not have a built-in depth of less than 60 mm in the past.

In the further subclaims, an accompanying optimization of parameters recognized to be essential in the context of the invention is effected, which in combination even make it possible not to only achieve but even to exceed the thermal output of commercially available flat tube evaporators of the type the invention refers to.

Apart from the already mentioned structural depth and the interspace occupied by a zig zag fin each between two adjacent flat tubes (claims 2 and 3 as well as claims 4 and 5), here an accompanying optimization of the thickness measured between the flat sides of the flat tubes (claims 6 to 9), of the wall thickness of the flat tubes between their outer face and their respective inner chamber (claims 10 to 14) and of the pitch or spacing of the zig zag fins (claims 15 to 19) is effected. The length of the flat tubes has turned out to be uncritical with respect thereto and can be adapted to the corresponding available built-in space in the motor vehicle.

Within the scope of invention, partially different from the use in some profession companies, pitch or spacing means the distance of adjacent apexes of the same zig zag fin or the repetition distance of the same phases of the zig zag turns, respectively.

In one embodiment, a dual flow (double-flow) hard-soldered (brazed) flat tube evaporator has one row in the air flow direction and is made of aluminum or an aluminum alloy for a motor vehicle air conditioning equipment. On the inlet side, a distributor (24, 28) of the refrigerant to the inlets of individual flat tubes (2) or preferably to groups of the same is provided. The flat tubes are extruded multi-chamber tubes, between which zig zag fins (12) are internested in a sandwich fashion. The structural depth (B) of the evaporator is at least 25 mm and at most 50 mm. The interspace (LH) occupied by a zig zag fin (12) between two adjacent flat tubes (2) is at least 5 mm and at most 9 mm.

The structural depth (B) may be at most 40 mm. The structural depth (B) may be at least 35 mm. The interspace (LH) may be at most 8 mm. The interspace (LH) may be at least 6 mm. The thickness (d) of the flat tubes (2) measured between the flat sides (4) thereof may be at most 2 mm. Alternatively, the thickness (d) may be at most 1.8 mm. The thickness (d) may be at least 1 mm. Alternatively, the thickness may be at least 1.5 mm. The wall thickness (w) of the flat tubes (2) between their outer face and their respective inner chamber may be at most 0.5 mm. Alternatively, the wall thickness (w) may be at most 0.4 mm. Alternatively, the wall thickness (w) is at most 0.25 mm. The wall thickness (w) may be at least 0.2 mm. Alternatively, the wall thickness (w) is 0.3 mm. The pitch (spacing) (T) of the zig zag fins (12) may be at most 4 mm. Alternatively, the pitch (T) is at most 3 mm. Alternatively, the pitch (T) is at least 2 mm. The pitch (T) may be at least 2.4 mm. Alternatively, the pitch (T) is in the region of 2.6 to 2.8 mm.

DETAILED DESCRIPTION OF DRAWINGS

Figure 2:
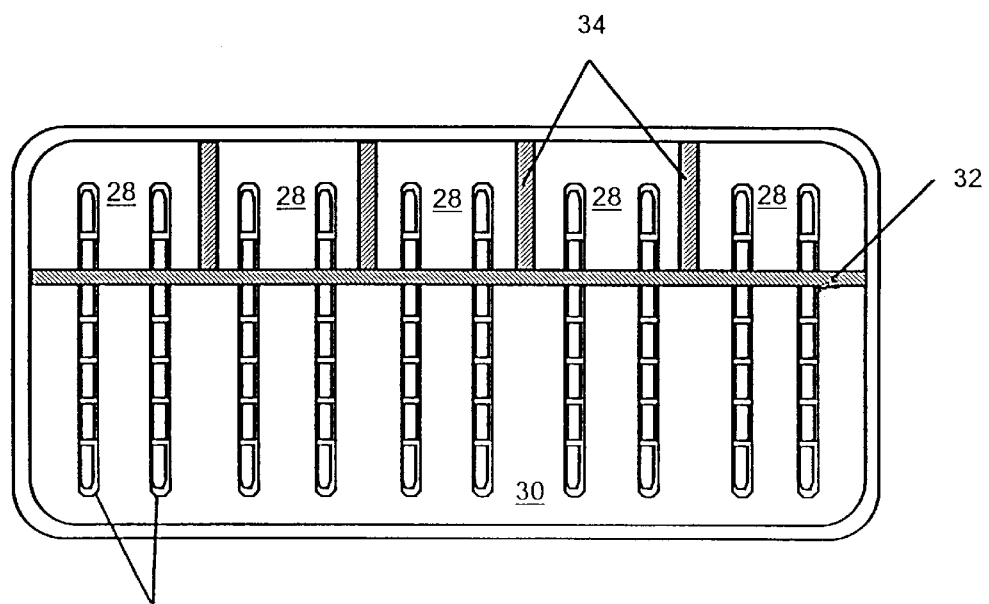
Figure 3:
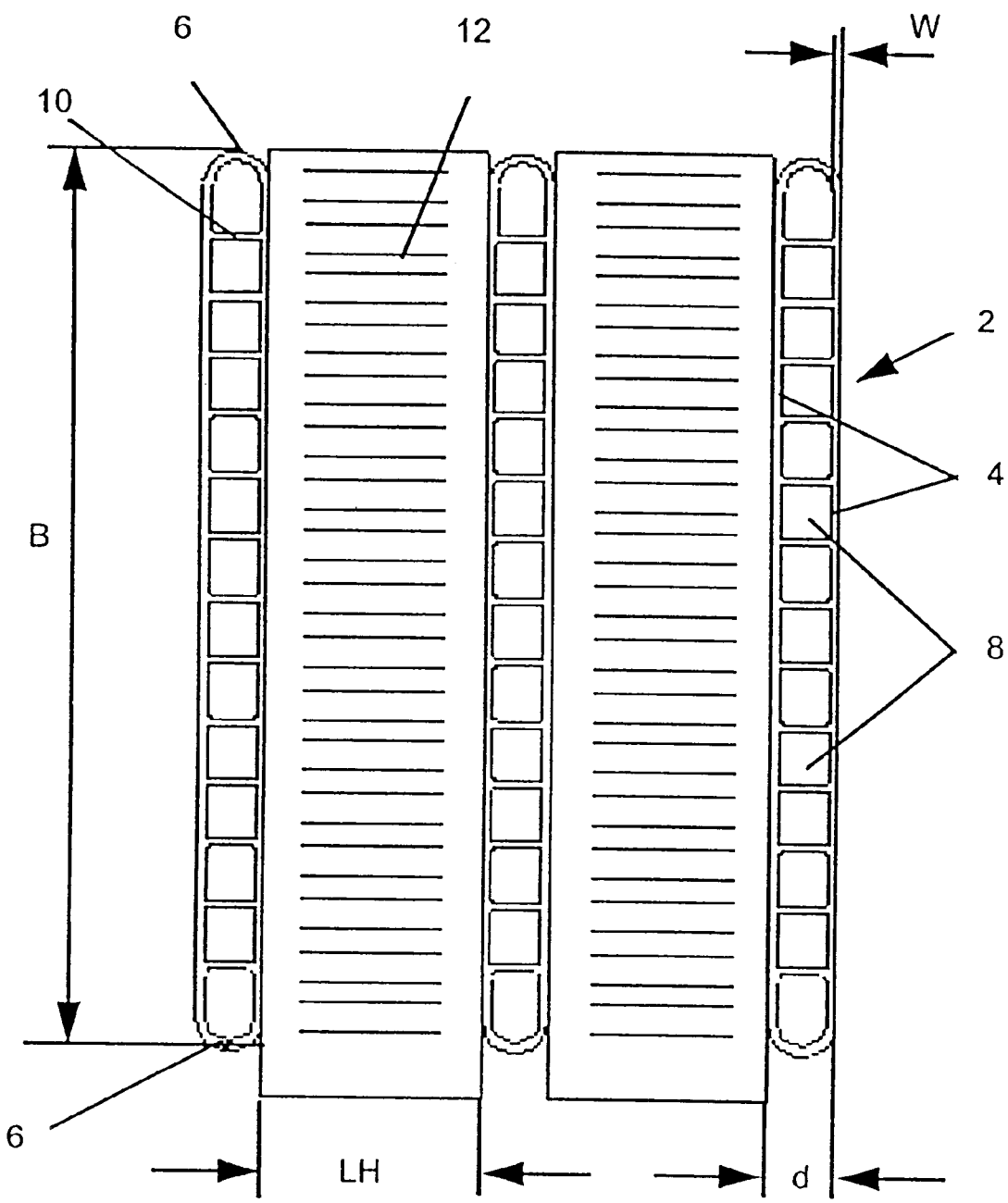
Figure 4:
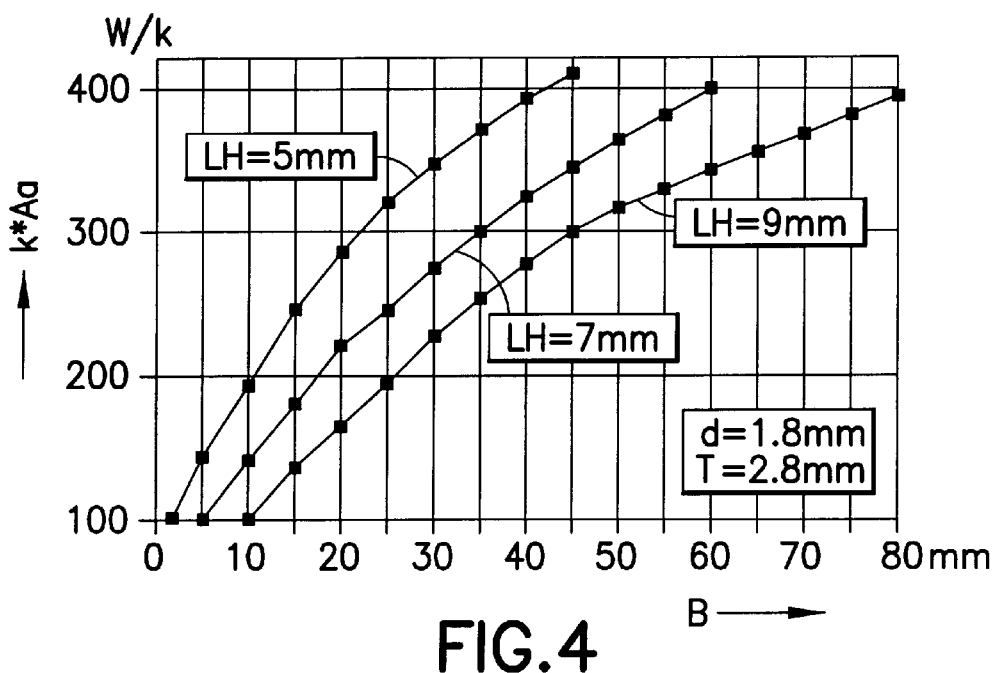
Figure 5:
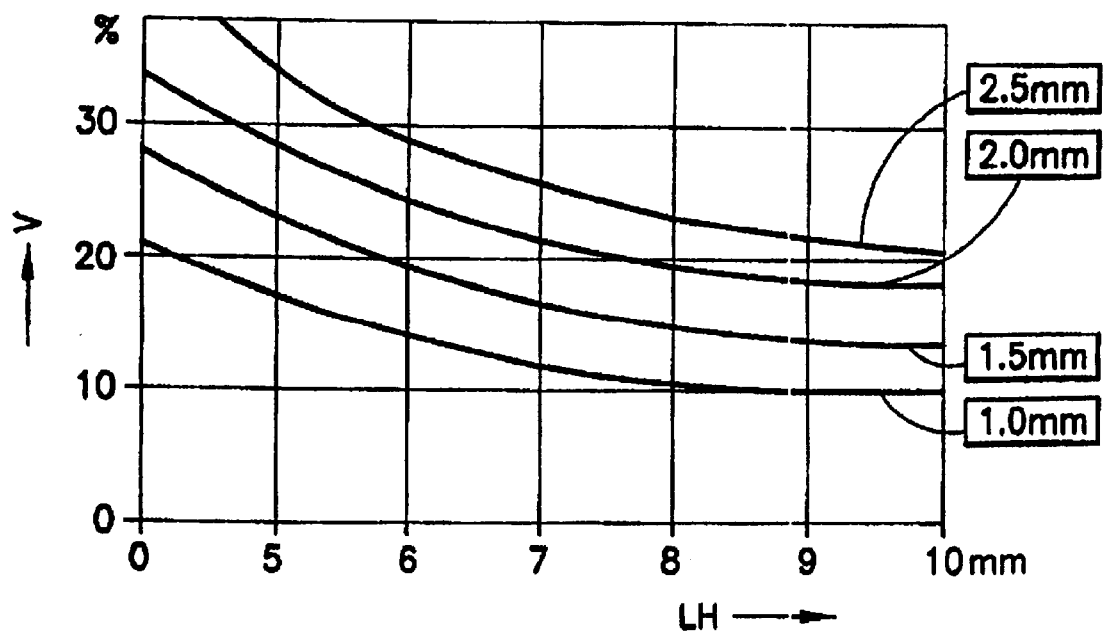
Figure 6:
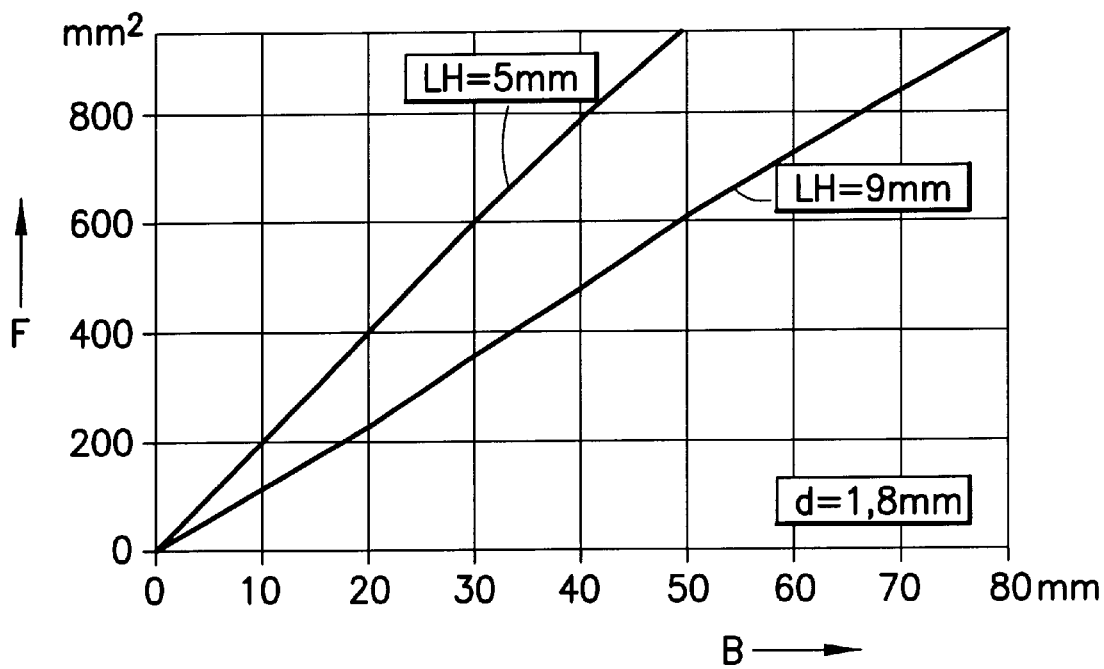
Figure 7:
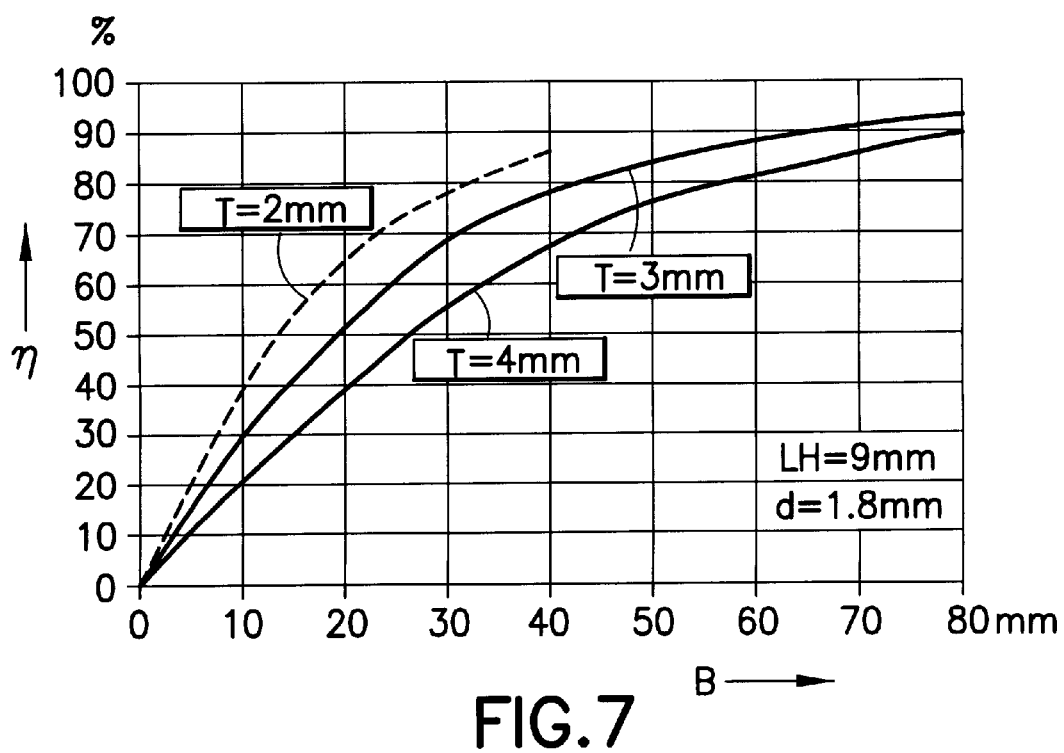

The invention will be illustrated more in detail by means of schematic drawings as follows, wherein:

FIG. 1 shows in a perspective and partially broken off representation an example of a double-flow flat tube evaporator, to which the dimensional statements of the invention refer;

FIG. 2 shows a plan view on the tube bottom of the header serving as distributor from the internal room thereof, namely with respect to an inlet chamber into a group of flat tubes;

FIG. 3 shows a cross-section through the block of the flat tubes of the evaporator according to FIGS. 1 and 2, ribbed with the zig zag fins in a sandwich fashion;

FIG. 4 shows a diagram with the structural depth B as abscissa, the heat exchanger characteristic k×$A_A$ as ordinate and the interspace LH as group of parameter curves;

FIG. 5 shows a diagram with the free distance LH as abscissa, the blocking of the flat tubes with respect to the complete inflow face in % as ordinate and the tube thickness d as group of parameter curves;

FIG. 6 shows a diagram with the structural depth B of the evaporator as abscissa, the flow cross-section face F for the refrigerant as ordinate and the interspace LH as group of parameter curves;

FIG. 7 shows a diagram with the structural depth B as abscissa, the heat exchanger efficiency 72 as ordinate and the fin pitch or spacing T as group of curves.

The flat tube evaporator represented in FIGS. 1 to 3 consists in all its represented components of aluminum or an aluminum alloy and is brazed on its components.

The flat tubes 2 each comprise parallel similar flat sides 4 as well as front ends 6, which here have a streamline profile without restricting the generality, which, however, can also be otherwise designed at a right angle to the flat sides with a rounded or even cornered or blunt design, respectively. Within each flat tube, chambers 8 each as continuous ducts are divisioned off by parting walls 10. The number of essentially equally dimensioned chambers considered within the scope of invention is preferably between 5 and 15, depending on the actual structural depth.

The flat tubes 2 are ribbed as a block at a constant mutual distance LH each via zig zag fins interposed in a sandwich fashion, which preferably flush with the corresponding front sides 6 on the air inlet side and for a better water drain preferably project at the air outlet side with respect to the flat side 6 at that location according to the drawn representation in FIG. 3. In FIG. 3, the structural depth B is also stated as distance of the two front sides of the zig zag fins 12 in the inflow direction LR of the outer air, wherein on the inflow side as mentioned the front side flushes with the corresponding front side 6 of the flat tubes or is aligned in the crosswise direction LR of the flow, respectively, while at the outflow side the front side projects over the adjacent front sides L of the flat tubes 2.

The mutual distance of adjacent flat sides 4 of a pair of adjacent flat tubes 2 is named LH because it is identical to the so-called fin height (German: Lamellenhöhe) of the respective zig zag fin.

Each flat tube 2 has a tube thickness d measured between its two opposite flat sides 4 as well as a wall thickness w between each chamber 8 and the outer flat side 4 of the respective flat tube 2.

Each zig zag fin 12 furthermore has a pitch or spacing T which describes the distance of adjacent similar phases of the zig zag fin such as the distance of adjacent apexes at one side of the respective zig zag fin.

The external admission of the flat tubes 2 serving as heat exchange tubes of the evaporator is effected by atmospheric air in the motor vehicle corresponding to the arrow LR (air direction) in FIGS. 1 and 3.

The internal admission of each flat tube 2 is a double-flow admission corresponding to the reversion arrow UP in FIG. 1. According to FIG. 1, individual end caps 14 serve for the flow reverse at the one end of the respective flat tubes in the block, the function of which can, however, also be taken over by a common reversion case (or tank or header) or another member for reversing the flow.

The supply of the refrigerant to the evaporator is effected corresponding to the supply arrow Z in FIG. 1 via a connecting sleeve 16 at the front side of a tank like a header 18 of tube bottom 20 and cap 22. The ends of the flat tubes 2 facing away from the end caps 14 are in this case received in slits or outer and/or inner collars of the tube bottom 20, such that they can communicate with the inner room of the header 18.

The connecting sleeve 16 of the header 18 on the inlet side therein passes over into a manifold 24 of a distribution means, which manifold is terminated at its free end and comprises an outlet opening 26 each at its periphery, which each communicates with an inlet chamber 28 of a group of more than one flat tube 2 inserted in the tube bottom 20. The number of flat tubes assigned to one inlet chamber can here vary in dependency of the distance of the respective outlet opening 26 from the connecting sleeve 16, which, however, is not yet realized in FIG. 2, where, without restricting the generality, two flat tubes each communicate with one inlet chamber 28. In the context of the invention, in practice preferably the number of only one flat tube 2 per inlet chamber up to five flat tubes per inlet chamber is possible, namely as already mentioned with this number being constant as well as with an adapted variety between the mentioned limits 1 and 5.

The second flow of all flat tubes, seen in the flow direction of the refrigerant, communicates with a common outlet chamber 30 in the header 18, which extends over the whole length thereof and the flow of which is separated from the individual inlet chambers 28 by a longitudinal partition 32 also extending in the header 18 longitudinally thereof. The inlet chambers 28 in turn are separated from one another by crosswise walls 34 at least for a major part or completely. In this case, the crosswise walls 34 extend at a right angle starting from the side of the longitudinal partition 32 facing away from the outlet chamber 30.

The outlet chamber 30 communicates with an outer flow outlet 36 of the refrigerant from the evaporator.

The flow outlet can also be designed as an external connecting sleeve like the inlet sleeve 16 according to the drawn representation in FIG. 1. Naturally, the flow inlet and the flow outlet is also possible in any other possible design, even in a design in which the two outlets are provided at opposite front sides of the header 18. Likewise, one could think of providing the flow outlet or—in a special construction, e.g. using diecast—also the flow inlet at the longitudinal side of the header 18. Finally, within the scope of the invention it is neither excluded that the tank means on the inlet side and on the outlet side is formed by separate headers, such that then the longitudinal crosswise wall 32 is dispensed with in each of these separate headers.

In the diagram of FIG. 4, the heat exchanger characteristic $(k \times A_A)$ is outlined over the structural depth (B) of the flat tube evaporator. The heat exchanger characteristic is formed of the product of the heat transfer coefficient (k) and the total external surface in contact with the air $(A_A)$ and has the unit Watt/Kelvin. The structural depth is outlined in millimeter. The dashed curve applies to an interspace LH=5 mm occupied by the fin, the dot-dashed curve applies to LH=7 mm, the continuous curve to LH=9 mm.

The whole group of curves (LH) applies to a tube thickness d=1.8 mm and a fin pitch T=2.8 mm.

FIG. 4 illustrates the surprising effect of the invention, that with a corresponding selection of the tube thickness (d) as well as of the interspace (LH) occupied by the fin, the heat exchanger characteristic $(k \times A_A)$ can still be kept constant when bisecting the structural depth (B).

For example, an evaporator with a structural depth of 60 mm can be reduced to a structural depth of about 30 mm, if the interspace (LH) occupied by the fin is reduced from 9 mm to 5 mm and a tube thickness of d=1.8 mm is used. Despite a considerably smaller external surface, but also with a smaller internal heat transfer surface, this equality in performance at a bisected structural depth (B) is achieved, as the lacking internal and external heat transfer surface is compensated by an improved refrigerant distribution in the flat tubes of a reduced structural depth (B) and by considerably higher heat transfer coefficients on the internal as well as on the external side.

Due to the bisected structural depth, when using the evaporator in motor vehicle air conditioning equipment, this results in considerable advantages with respect to the fitting space and the weight.

When reducing the interspace (LH) occupied by the fin, according to FIG. 5 it has to be observed that the blocking (V) of the flat tubes on the side of the air, which is outlined as ordinate in per cent in FIG. 5, does not become too large, as otherwise with a predetermined amount of air the air velocities in the interspace (LH) occupied by the fin become too high and the condensed water can no longer drain in the fin block in the zig zag fins without being entrained by the air.

With the built-in spaces and flows of air volume predetermined in motor vehicles, therefore a blocking on the side of the atmospheric air of 22% should not be exceeded. This means that when reducing the interspace (LH) occupied by the fin, the tube thickness (d) also has to be reduced. With an interspace (LH) of 5 mm, therefore a tube thickness (d) of 1–1.5 mm and with an interspace (LH) of e.g. 7 m one of 1.5–2 mm should be applied.

Apart from the blocking of the flat tubes on the side of the atmospheric air, which is essential for the drain of the condensed water but also for the pressure loss on the side of the air, furthermore the flow surface (F) is of an essential importance.

FIG. 6 shows the relation between the flow surface (F) (mm$^2$) and the structural depth (B) (mm) and the free interspace (LH) for a tube thickness of d=1.8 mm. The dashed line here applies to an interspace (LH) of 5 mm, while the continuous line applies to LH=9 mm.

For a maximum performance, on the one hand the internal heat transfer coefficient has to be very high, which is achieved by a high flow velocity and a small flow cross-section (F), and on the other hand the pressure loss on the side of the refrigerant must neither become too high due to a flow velocity which is too high, as otherwise the efficient temperature difference between the refrigerant and the in-flowing atmospheric air is reduced to a too great extent. For the maximum of the product between the efficient temperature difference and the internal heat transfer coefficient, a flow surface (F) of 400–600 mm$^2$ is required for the mean performance region of a motor vehicle air conditioning equipment. This minimum flow surface (F) can be efficiently achieved when reducing the structural depth (B) according to FIG. 6 by increasing the number of tubes and thus by reducing the interspace (LH) occupied by the fin.

Due to a reduced tube thickness (d) in connection with a reduced wall thickness (w), even with a reduced interspace (LH) an increase of the blocking (V) on the side of the air can be avoided.

Due to the design of the interspace (LH), the tube thickness (d) as well as the wall thickness of the tube (w), which are all adapted to one another, the heat transfer characteristic ($k \times A_A$) shown in FIG. 4 can be kept constant at a bisected structural depth. This, however, is only possible, when the fin pitch (T) is not selected to be too great, e.g. as in FIG. 1 with T=2.8 mm.

FIG. 7 shows the influence of the fin pitch (T) on the efficiency of the heat exchanger ($\eta$) which is outlined as ordinate above the structural depth (B) as abscissa. The parameter curves for the fin pitch (T) apply to a constant fin height (LH) of 7 mm as well as to a constant tube thickness of d=1.8 mm.

Surprisingly, in flat tube evaporators of the design described in the introductory part of claim 1, the influence of the fin pitch is considerably greater with small structural depths than with otherwise conventional structural depths of more than 60 mm. This effect can, in addition to the influences of the interspace (LH), the tube thickness (d) and the wall thickness (w), be utilized in evaporators with small structural depths, such that it is just in the region of the structural depths of 20–40 mm that a considerable increase in the heat exchange efficiency due to a smaller fin partition of T=2 to T=3 mm is achieved, which could not be expected with structural depths of more than 60 mm conventional in the past.

What is claimed is:

1. A dual flow flat tube evaporator having one row in the air flow direction for a motor vehicle air conditioning equipment, comprising:

a plurality of multi-chamber flat tubes;

a distributor of a refrigerant to inlets of individual flat tubes or to groups of the same;

zig zag fins internested in a sandwich fashion between the flat tubes, whereas the interspace occupied by a zig zag fin between two adjacent flat tubes is at least 5 mm and at most 9 mm; and the evaporator having a structural depth of at least 25 mm and at most 50 mm.

2. A flat tube evaporator according to claim 1, wherein the structural depth is at most 40 mm.

3. A flat tube evaporator according to claim 1, wherein the structural depth is at least 35 mm.

4. A flat tube evaporator according to claim 1, wherein the interspace is at most 8 mm.

5. A flat tube evaporator according to claim 1, wherein the interspace is at least 6 mm.

6. A flat tube evaporator according to claim 1, wherein the thickness of the flat tubes measured between the flat sides thereof is at most 2 mm.

7. A flat tube evaporator according to claim 6, wherein the thickness is at most 1.8 mm.

8. A flat tube evaporator according to claim 6, wherein the thickness is at least 1 mm.

9. A flat tube evaporator according to claim 6, wherein the thickness is at least 1.5 mm.

10. A flat tube evaporator according to claim 1, wherein a wall thickness of the flat tubes between an outer face and a respective inner chamber is at most 0.5 mm.

11. A flat tube evaporator according to claim 10, wherein the wall thickness is at most 0.4 mm.

12. A flat tube evaporator according to claim 11, wherein the wall thickness is at most 0.25 mm.

13. A flat tube evaporator according to claim 11, wherein the wall thickness is at least 0.2 mm.

14. A flat tube evaporator according to claim 1, wherein the wall thickness is 0.3 mm.

15. A flat tube evaporator according to claim 1 wherein the pitch of the zig zag fins is at most 4 mm.

16. A flat tube evaporator according to claim 15, wherein the pitch is at most 3 mm.

17. A flat tube evaporator according to claim 15, wherein the pitch is at least 2 mm.

18. A flat tube evaporator according to claim 15, wherein the pitch is at least 2.4 mm.

19. A flat tube evaporator according to claim 1, wherein the pitch is in the region of 2.6 to 2.8 mm.

20. A flat tube evaporator according to claim 1, wherein:

the evaporator is made of aluminum or an aluminum alloy.

21. A flat tube evaporator, comprising:

a plurality of adjacent flat tubes aligned substantially parallel with one another, wherein the depth of the flat tubes is at least approximately 25 mm and not more than approximately 50 mm, and the spacing between adjacent flat tubes is at least approximately 5 mm and not more than approximately 9 mm.

22. An evaporator according to claim 21, wherein:

the evaporator is a dual flow evaporator.

23. An evaporator according to claim 21, further comprising:

means for distributing a refrigerant to inlets of the flat tubes.

24. A motor vehicle air conditioning system comprising the component of claim 21.

25. An evaporator according to claim 21, further comprising: zig zag fins internested between the plurality of flat tubes.

26. An evaporator according to claim 25, wherein:

a wall thickness of the flat tubes between an outer face and an inner face is at most approximately 0.4 mm and the pitch of the zig zag fins is at most approximately 3 mm.

27. An evaporator according to claim 26, wherein:

the thickness of the flat tubes measured between the flat sides thereof is at most approximately 2 mm.

28. An evaporator according to claim 21, wherein:

the structural depth of the evaporator is at least approximately 35 mm and at most approximately 40 mm.

29. An evaporator according to claim 28, wherein:

the interspace between two adjacent flat tubes is at least approximately 6 mm and at most approximately 8 mm.

30. An evaporator according to claim 21, wherein:

the thickness of the flat tubes measured between the flat sides thereof is at least approximately 1 mm and at most approximately 2 mm.

31. An evaporator according to claim 30, wherein:

a wall thickness of the flat tubes between an outer face and an inner face is at most approximately 0.4 mm.

32. A method for conditioning air, comprising:

distributing a refrigerant through a plurality of aligned flat tubes separated from one another by at least approximately 5 mm and not more than approximately 9 mm; and distributing a stream of air across zig zag fins placed between adjacent flat tubes, the distance across the zig zag fins being at least approximately 25 mm and not more than approximately 50 mm.

* * * * *